US012763436B2

(12) United States Patent
Matsumura et al.

(10) Patent No.: US 12,763,436 B2
(45) Date of Patent: Oct. 13, 2026

(54) BUS BAR AND POWER STORAGE MODULE

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventors: Nobuyuki Matsumura, Osaka (JP); Osamu Nakayama, Osaka (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 413 days.

(21) Appl. No.: 18/689,730

(22) PCT Filed: Sep. 9, 2022

(86) PCT No.: PCT/JP2022/033869
§ 371 (c)(1),
(2) Date: Mar. 6, 2024

(87) PCT Pub. No.: WO2023/047980
PCT Pub. Date: Mar. 30, 2023

(65) Prior Publication Data

US 2025/0141052 A1 May 1, 2025

(30) Foreign Application Priority Data

Sep. 27, 2021 (JP) ................................ 2021-156362

(51) Int. Cl.
*H01M 50/503* (2021.01)
*H01B 5/02* (2006.01)
*H01G 11/10* (2013.01)

(52) U.S. Cl.
CPC ............ *H01M 50/503* (2021.01); *H01B 5/02* (2013.01); *H01G 11/10* (2013.01)

(58) Field of Classification Search
CPC ........ H01M 50/503; H01B 5/02; H01G 11/10
See application file for complete search history.

(56) References Cited

U.S. PATENT DOCUMENTS

2009/0274956 A1 11/2009 Kosugi et al.
2012/0009461 A1 1/2012 Kim et al.
(Continued)

FOREIGN PATENT DOCUMENTS

JP 2009-088761 4/2009
JP 2012-018904 1/2012
(Continued)

OTHER PUBLICATIONS

International Search Report issued in WIPO Patent Application No. PCT/JP2022/033869, dated Nov. 22, 2022, along with an English translation thereof.

*Primary Examiner* — Sarah A. Slifka
(74) *Attorney, Agent, or Firm* — Greenblum & Bernstein, P.L.C.

(57) ABSTRACT

A bus bar is a plate-shaped bus bar that connects a plurality of power storage elements, and includes a plurality of connection portions connected to electrode terminals of the plurality of power storage elements, and one or more intermediate portions that couple the adjacent connection portions, the connection portions include electrode welding portions disposed so as to respectively oppose the electrode terminals and welded to the electrode terminals, the intermediate portion is provided with one or more slits, and the
(Continued)

each slit has a shape elongated in an arrangement direction in which the connection portions are arranged side by side and has a predetermined dimension in a width direction orthogonal to both the arrangement direction and an opposing direction in which the electrode welding portions opposes the electrode terminals.

4 Claims, 15 Drawing Sheets

(56) References Cited

U.S. PATENT DOCUMENTS

| | | | |
|---|---|---|---|
| 2015/0140393 | A1 | 5/2015 | Yamamoto et al. |
| 2021/0020890 | A1 | 1/2021 | Omura et al. |
| 2021/0043909 | A1 | 2/2021 | Oga et al. |

FOREIGN PATENT DOCUMENTS

| | | |
|---|---|---|
| JP | 5976811 | 8/2016 |
| JP | 2017-130287 | 7/2017 |
| JP | 2018-060748 | 4/2018 |
| JP | 2021-026946 | 2/2021 |
| WO | 2019/188214 | 10/2019 |
| WO | 2021/140963 | 7/2021 |

BUS BAR AND POWER STORAGE MODULE

TECHNICAL FIELD

The present disclosure relates to a bus bar and a power storage module.

BACKGROUND ART

A power storage module of an electric car, a hybrid car, and the like includes many laminated power storage elements, and the power storage elements are electrically connected to each other in series or in parallel by bus bars. A laminated bus bar disclosed in JP 2021-26946A (hereinafter "Patent Document 1") is conventionally known as such a bus bar. The laminated bus bar includes a conductive plate-shaped first substrate having a plurality of first through holes lined up in a line at equal intervals, and a second substrate having a plurality of second through holes lined up in a line at equal intervals. The first substrate and the second substrate are laminated on one another and fixed to each other. The first through holes and the second through holes are arranged so as to oppose each other in a direction in which the first substrate and the second substrate are laminated. A thin portion, which is to be welded to an electrode terminal of a power storage element, is provided at a hole edge portion of each second through hole. The laminated bus bar has a bent portion between adjacent thin portions. The bent portion can be elastically deformed in a direction in which the first through holes are arranged side by side.

CITATION LIST

Patent Document

Patent Document 1: JP 2021-26946A

SUMMARY OF INVENTION

Technical Problem

However, in the above configuration, the laminated bus bar is not likely to deform in a direction (short side direction of the laminated bus bar) orthogonal to both the direction in which the first substrate and the second substrate are laminated and a direction in which the first through holes are arranged. And thus, after the laminated bus bar is welded to the power storage elements, if the power storage elements are displaced with respect to the short side direction of the laminated bus bar, stress acts on a portion where the laminated bus bar is welded to the electrode terminals, and the connection reliability between the laminated bus bar and the electrode terminals may be impaired.

Solution to Problem

A bus bar according to the present disclosure is a plate-shaped bus bar that connects a plurality of power storage elements to each other, the bus bar including a plurality of connection portions to be connected to electrode terminals of the plurality of power storage elements, and one or more intermediate portions that couple the adjacent connection portions, and the connection portions include electrode welding portions that are respectively disposed so as to oppose the electrode terminals and are welded to the electrode terminals, the intermediate portion is provided with one or more slits, and the slit has an elongated shape in an arrangement direction in which the connection portions are arranged side by side and has a predetermined dimension in a width direction orthogonal to both the arrangement direction and an opposing direction in which the electrode welding portions and the electrode terminals oppose each other.

Advantageous Effects of Invention

According to the present disclosure, a bus bar that is unlikely to impair electric connection with an electrode terminal can be provided.

DESCRIPTION OF EMBODIMENT

Figure 1:
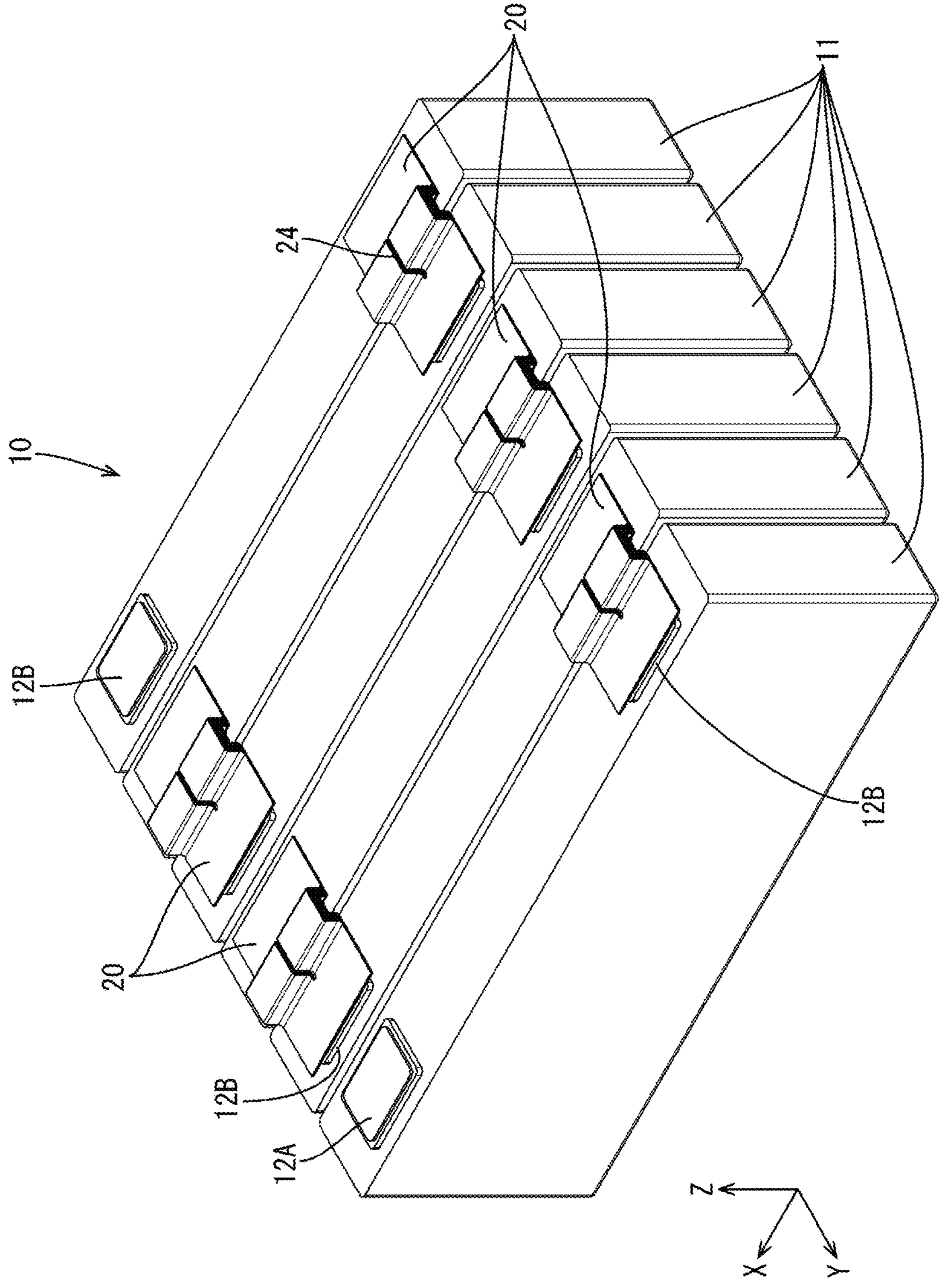
FIG. 1 is a perspective view of a power storage module according to the first embodiment.

Description of Embodiment of the Present Disclosure

First, aspects of an embodiment according to the present disclosure will be listed and described.

(1) A bus bar according to the present disclosure is a plate-shaped bus bar that connects a plurality of power storage elements to each other, the bus bar including a plurality of connection portions to be connected to electrode terminals of the plurality of power storage elements, and one or more intermediate portions that couple the adjacent connection portions, and the connection portions include electrode welding portions that are respectively disposed so as to oppose the electrode terminals and are welded to the electrode terminals, the intermediate portion is provided with one or more slits, and the slit has an elongated shape in an arrangement direction in which the connection portions are arranged side by side and has a predetermined dimension in a width direction orthogonal to both the arrangement direction and an opposing direction in which the electrode welding portions and the electrode terminals oppose each other.

Here, "a predetermined dimension" means a dimension that is not substantially recognized as zero, and is, for example, a dimension of a magnitude with which it can be recognized that the hole edge portions of a slit are spaced apart from each other in the width dimension.

According to this configuration, by providing the slit, the bus bar is likely to deform in the width dimension. Accordingly, in the case where the power storage elements are displaced in the width direction, stress that acts on the electrode welding portions welded to the electrode terminals can be reduced. Accordingly, the electrical connection between the bus bar and the electrode terminals is unlikely to be impaired.

(2) It is preferable that a plurality of the slits are provided for each intermediate portion, and are arranged side by side in the width direction.

With this configuration, by increasing the number of slits, the bus bar is more likely to deform in the width direction.

(3) It is preferable that the intermediate portion is a raised portion that protrudes from the connection portion in a direction away from the electrode terminals.

With this configuration, by providing the raised portion, the tolerance in the arrangement direction can be absorbed. Also, since the length of the bus bar disposed between the adjacent connection portions is increased, the bus bar is more likely to deform in the width direction.

(4) It is preferable that the raised portion includes a ceiling portion that is parallel with the connection portion, and a coupling portion that couples the ceiling portion and the connection portion, and the coupling portion is inclined toward the connection portion from the ceiling portion in the arrangement direction from the connection portion side toward the ceiling portion side.

Here, the meaning of "parallel" also includes positioning which can be recognized as being substantially parallel.

With this configuration, due to the coupling portion inclined toward the connection portion, the length of the bus bar disposed between the adjacent connection portions is increased, and the bus bar is more likely to deform in the width direction.

(5) It is preferable that the above-described bus bar includes a plurality of plate-shaped substrates laminated in the opposing direction.

With this configuration, since the volume of the bus bar can be easily increased, even if the voltage of the power storage elements increases, heat generated by the bus bar can be suppressed.

(6) It is preferable that the above-described bus bar includes a plurality of plate-shaped substrates laminated in the opposing direction, and the substrates each include a protruding portion that forms the raised portion, and a clearance is provided between the adjacent protruding portions.

With this configuration, since the clearance is provided between the adjacent protruding portions, each protruding portion is likely to deform separately. And thus, the bus bar is likely to deform in the width direction.

(7) A power storage module according to the present disclosure has a plurality of power storage elements and the bus bar according to any one 0p-1 to 6 that is connected to electrode terminals of the plurality of power storage elements.

With this configuration, a power storage module that is unlikely to impair electrical connection between the bus bar and the electrode terminal can be provided.

Detail of Embodiment of Present Disclosure

Hereinafter, an embodiment of the present disclosure will be described. The present disclosure is not limited to the examples, but is indicated by the claims, and is intended to include all modifications within the meaning and scope equivalent to the claims.

First Embodiment

A first embodiment of the present disclosure will be described with reference to FIGS. 1 to 9. As shown in FIG. 1, the power storage module 10 of the present embodiment includes a plurality of power storage elements 11 and bus bars 20 that electrically connect adjacent power storage elements 11 to each other. The power storage module 10 is to be mounted in a vehicle as a power supply for driving an electric car or a hybrid car, for example. In the following description, the direction indicated by the Z arrow is upward, the direction indicated by the X arrow is forward, and the direction indicated by the Y arrow is leftward. Note that, for a plurality of the same members, only some of the members are given a reference numeral, and the reference numeral of the other members is omitted in some cases.

Power Storage Element and Electrode Terminal

Each power storage element 11 has a flat rectangular parallelepiped shape, and houses power storing elements (not shown). Electrode terminals 12A and 12B are provided on an upper surface of each of the power storage elements 11. One of the electrode terminals 12A and 12B is a positive electrode, while the other is a negative electrode. The power storage elements 11 are not particularly limited and may be secondary batteries or capacitors. The power storage elements 11 according to the present embodiment are secondary batteries. A plurality (in the present embodiment, six) of power storage elements 11 are stacked in the left-right direction, and spacers (not shown) are disposed between adjacent power storage elements 11. In the present embodiment, the power storage elements 11 are arranged such that the electrode terminals 12A and the electrode terminals 12B are alternatively arranged side by side in the direction in which the power storage elements 11 are stacked.

Bus Bar

Figure 2:
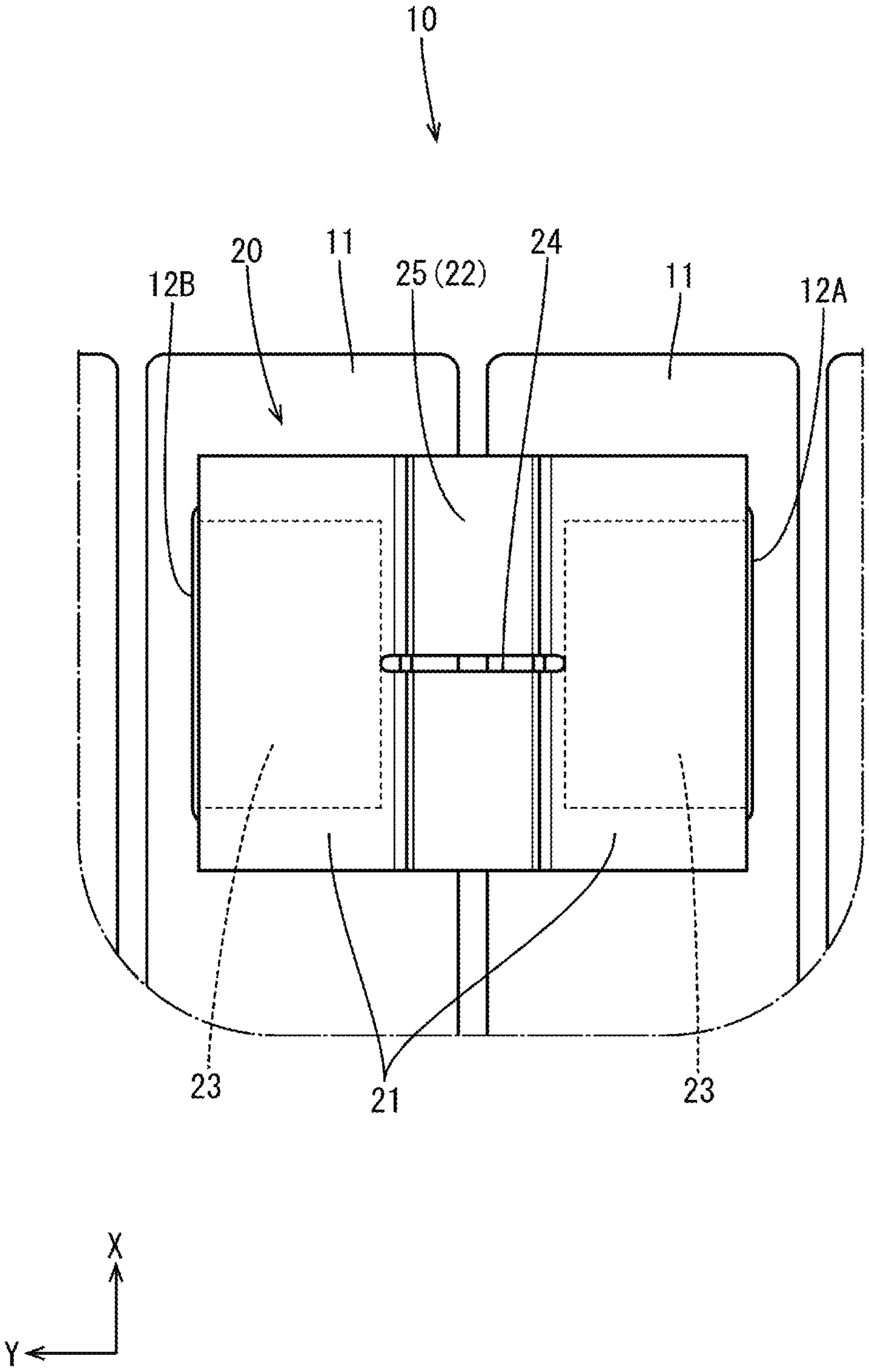
FIG. 2 is an enlarged plan view of the power storage module showing a surrounding region of a bus bar.
Figure 4:
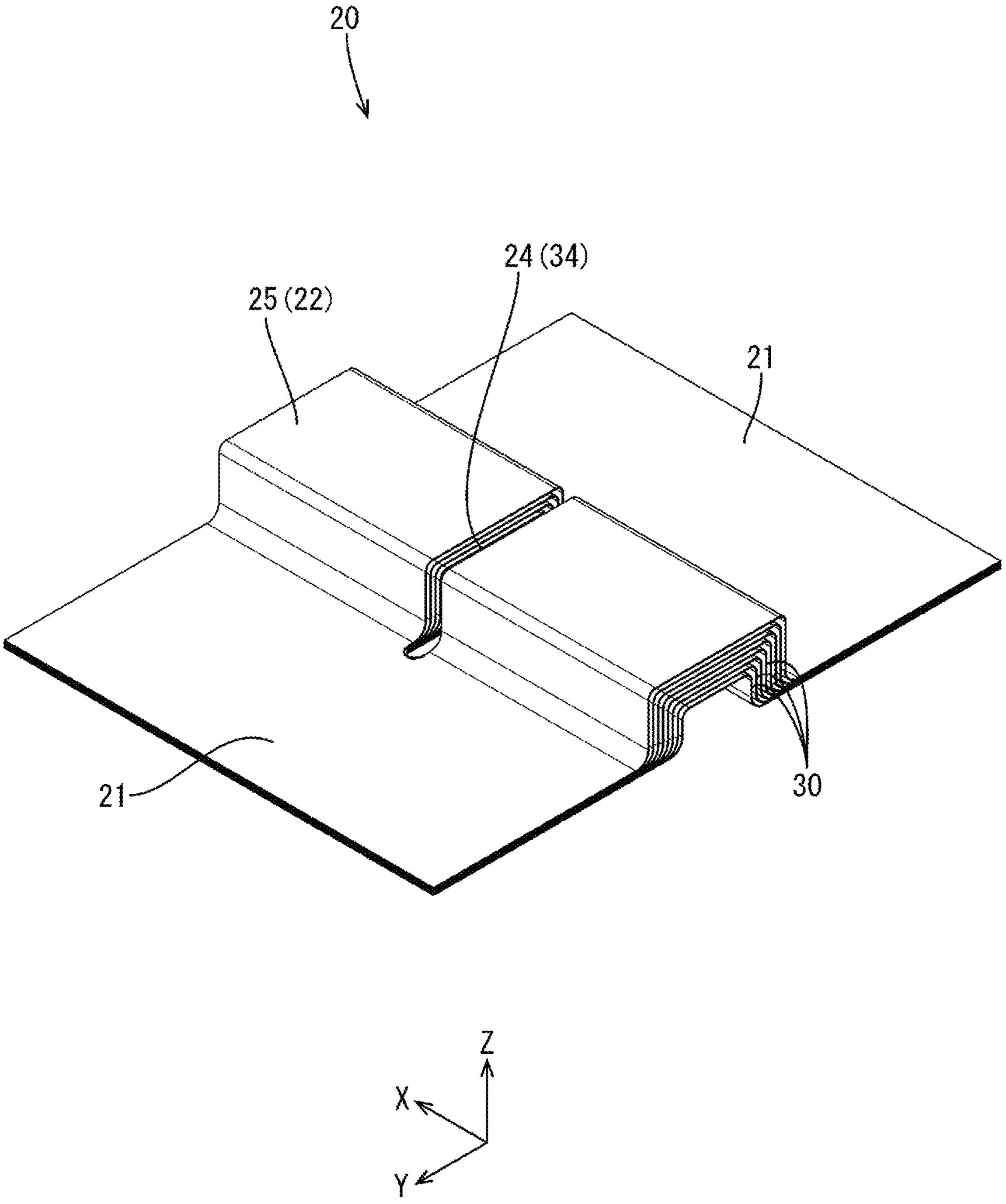
FIG. 4 is a perspective view of the bus bar.

As shown in FIG. 4, each bus bar 20 is formed using a conductive metal plate member. Specifically, as described later, the bus bar 20 is formed by laminating a plurality of plate-shaped substrates 30 in the up-down direction. Examples of the metal that constitutes the bus bar 20 include copper, a copper alloy, aluminum, an aluminum alloy, and stainless steel (SUS). As shown in FIGS. 1 and 2, the bus bars 20 are attached to the upper surfaces of adjacent power storage elements 11 and electrically connect the electrode terminals 12A and 12B (i.e., a positive electrode and a negative electrode) of adjacent power storage elements 11 to each other.

Connection Portion, Intermediate Portion, and Electrode Welding Portion

As shown in FIG. 2, each bus bar 20 has two connection portions 21 and an intermediate portion 22 that couples the two connection portions 21 to each other. The connection portions 21 are plate-shaped and laid on the electrode terminals 12A and 12B. Electrode welding portions 23 are respectively provided on the lower surfaces of left and right connection portions 21 so as to oppose the upper surfaces of the electrode terminals 12A and 12B. The electrode welding portions 23 are electrically and physically connected to the respective upper surfaces of the electrode terminals 12A and 12B through welding. In the present embodiment, an arrangement direction in which the connection portions 21 are arranged side by side is the left-right direction, and an opposing direction in which the electrode welding portions 23 and the electrode terminals 12A and 12B oppose each other is the up-down direction.

Slit

Figure 3:
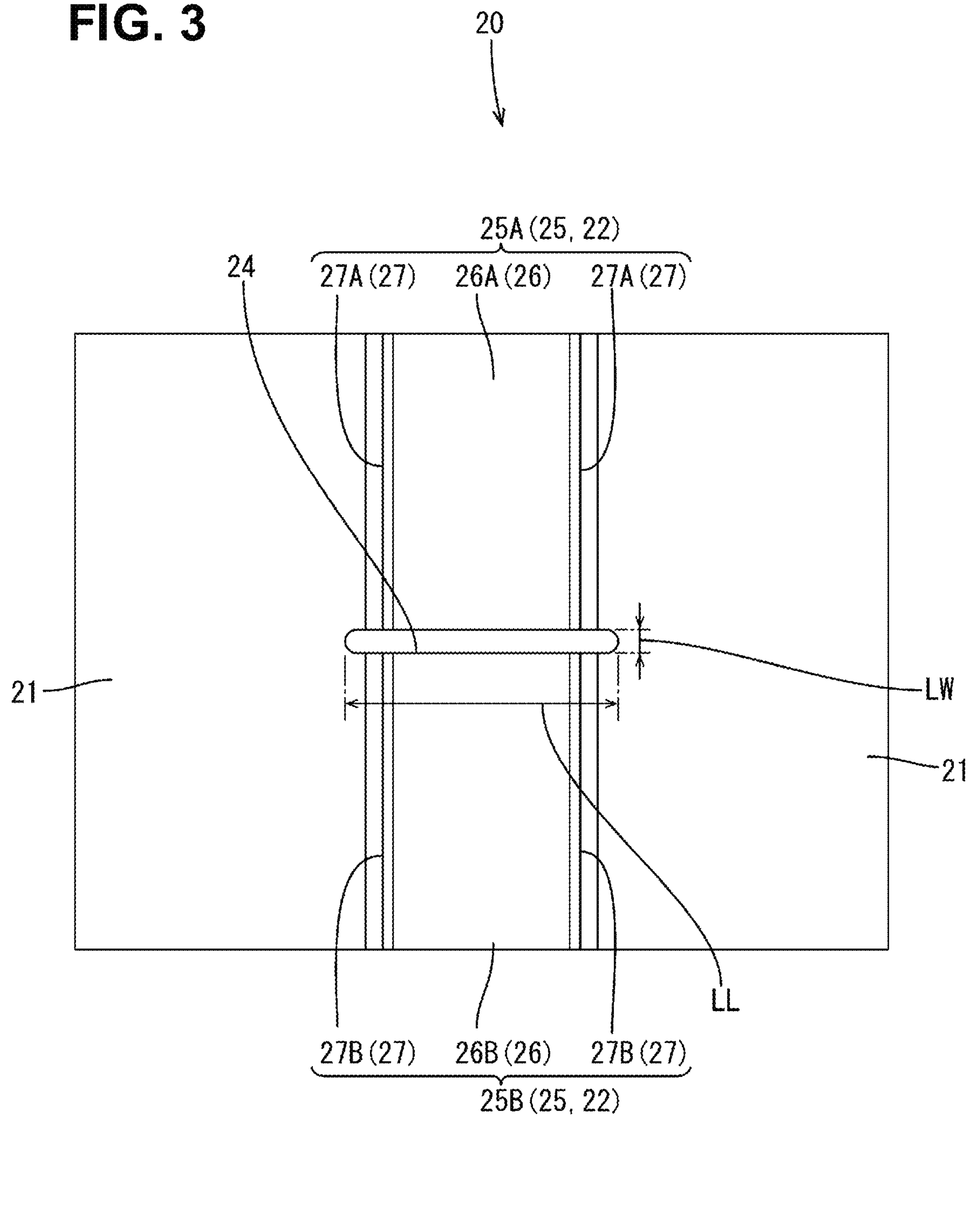
FIG. 3 is a plan view of the bus bar.

As shown in FIG. 2, each bus bar 20 has a slit 24 that extends through the intermediate portion 22 in the up-down direction. The slit 24 is located at the center position in the front-rear direction of the bus bar 20. As shown in FIG. 3, the slit 24 is elongated in the left-right direction and has a predetermined dimension in the width direction. The width direction of the slit 24 in the present embodiment is the front-rear direction. Here, "a predetermined dimension" refers a dimension with a magnitude that is not substantially recognized as zero, and for example, a dimension to the extent to which that the hole edge portions of the slit 24 are spaced apart from each other in the width direction (the front-rear direction) can be recognized. In the present embodiment, the dimension LW of the slit 24 in the width direction (the front-rear direction, the short side direction) is about 8% of the dimension LL of the slit 24 in the longitudinal direction (the left-right direction).

Raised Portion

Figure 5:
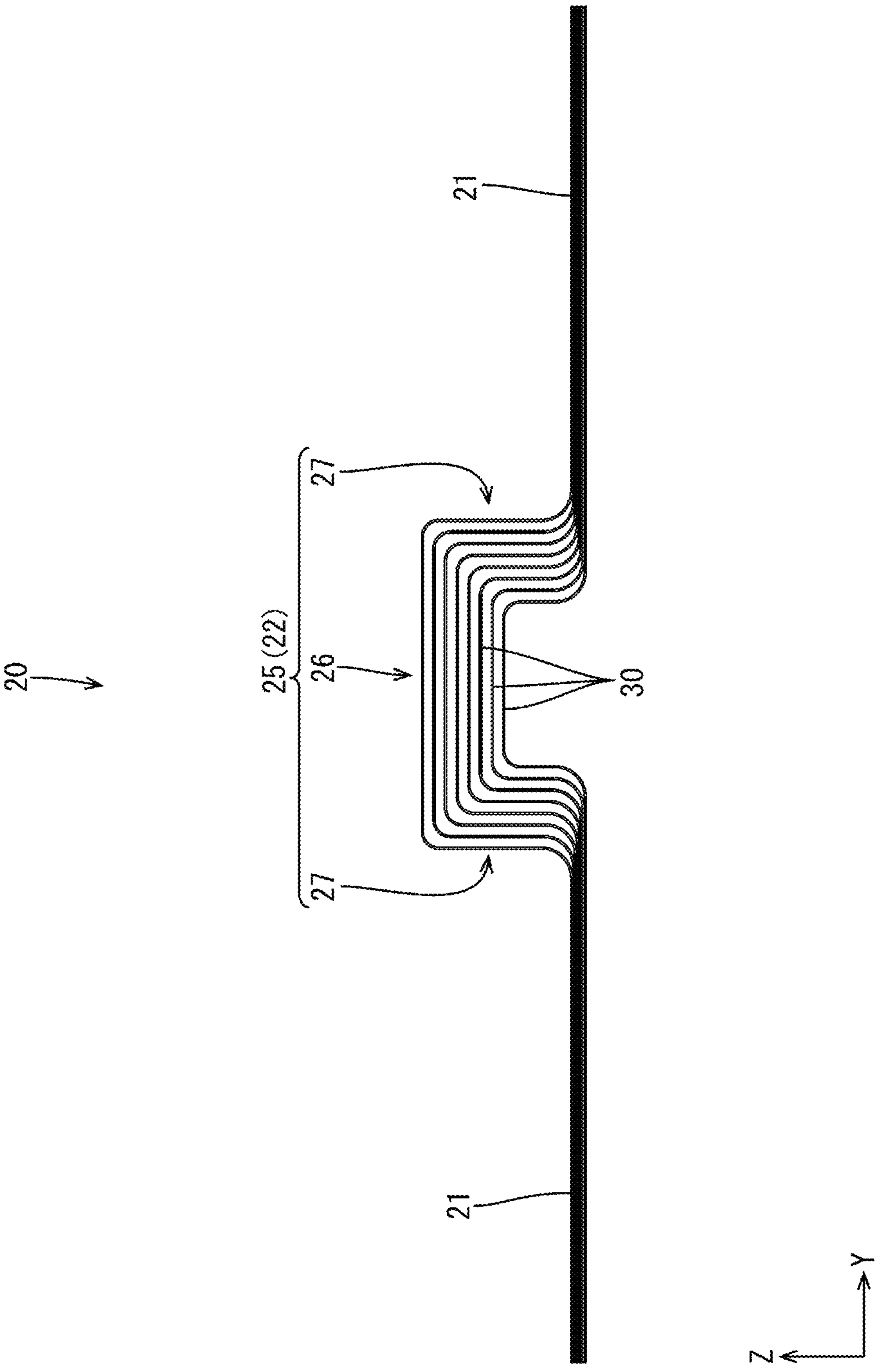
FIG. 5 is a front view of the bus bar.

As shown in FIG. 4, the intermediate portion 22 in the present embodiment is a raised portion 25 that protrudes from the connection portions 21 in a direction away from the electrode terminals 12A and 12B, that is, upward. As shown in FIG. 5, the raised portion 25 has an inverted U shape that has corners as seen in the front view. The raised portion 25 includes a ceiling portion 26 that is parallel with the connection portions 21, and two coupling portions 27 that couple the ceiling portion 26 and the connection portions 21. Specifically, the left coupling portion 27 connects a right end portion of the left connection portion 21 to a left end portion of the ceiling portion 26, and the right coupling portion 27 connects a left end portion of the right connection portion 21 to a right end portion of the ceiling portion 26. The coupling portions 27 are provided perpendicular to the connection portions 21. Note that, in the present disclosure, being "parallel" and "perpendicular" include arrangements that can be substantially recognized as parallel and perpendicular.

The raised portion 25 absorbs tolerances in the left-right direction and the up-down direction by elastically deforming. Also, by providing the raised portion 25, the length of the bus bar 20 disposed between the two electrode welding portions 23 can be larger compared to a case where no raised portion 25 is provided (see a flat-plate shaped bus bar 320 shown in FIG. 14). In other words, since the residual length of the bus bar 20 is provided to the raised portion 25, even if the left and right connection portions 21 are displaced in the front-rear direction, the bus bar 20 can easily deform (the details of which will be described later).

As shown in FIG. 3, the slit 24 extends through the raised portion 25 in the up-down direction. Specifically, the dimension LL in the left-right direction of the slit 24 is larger than the dimension in the left-right direction of the raised portion 25, and left and right end portions of the slit 24 are disposed at portions of the connection portions 21 that are near the raised portion 25. In other words, the raised portion 25 is divided in the front-rear direction by the slit 24. A portion of the raised portion 25 on the front side of the slit 24 is a first raised portion 25A. A portion of the raised portion 25 on the rear side of the slit 24 is a second raised portion 25B. The first raised portion 25A includes a first ceiling portion 26A that is the front portion of the ceiling portion 26 and two first coupling portions 27A that are the front portions of the coupling portions 27. The second raised portion 25B includes a second ceiling portion 26B that is the rear portion of the ceiling portion 26 and two second coupling portions 27B that are the rear portions of the coupling portions 27.

Substrate and Protruding Portion

Figure 7:
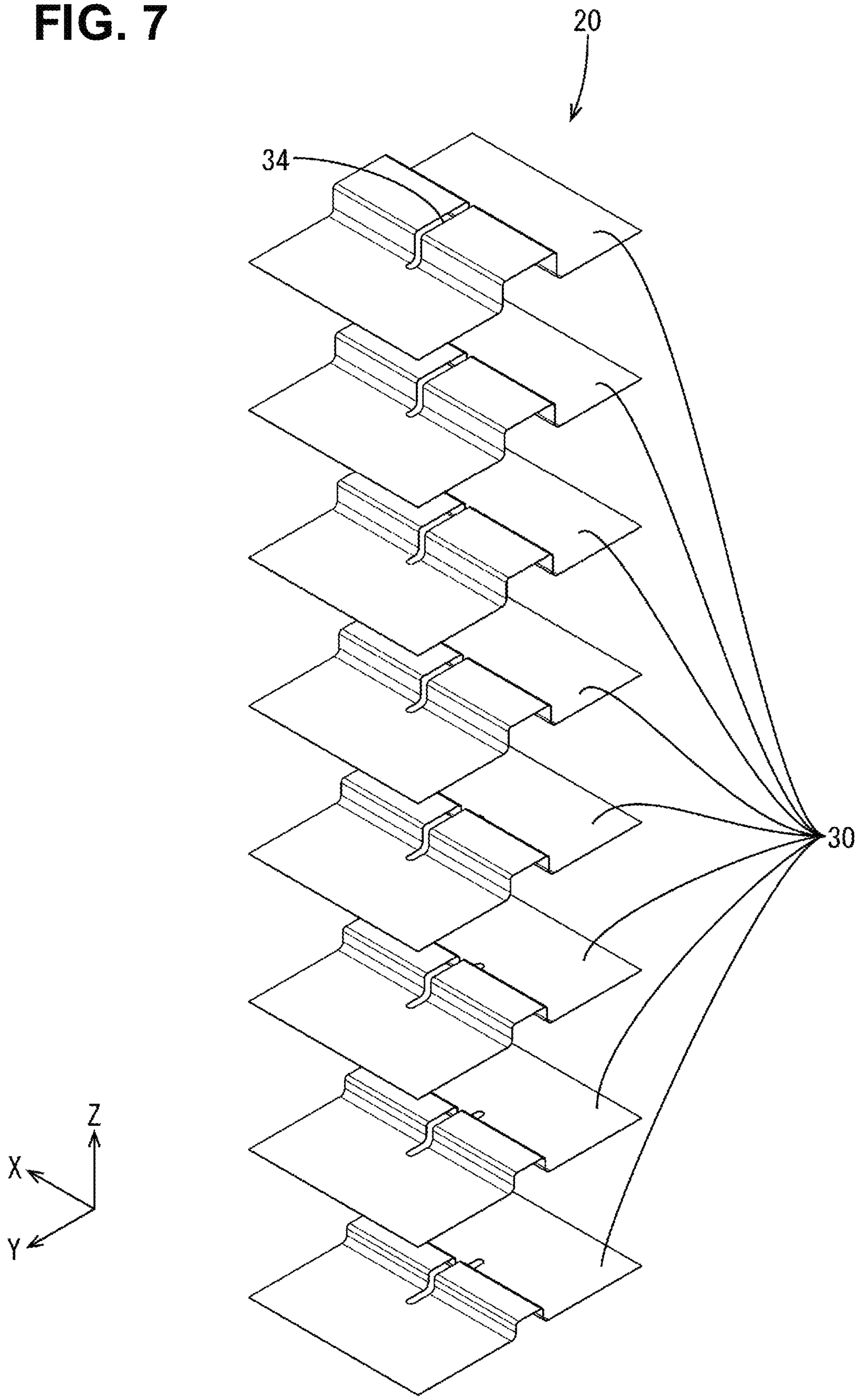
FIG. 7 is an exploded perspective view of the bus bar.
Figure 8:
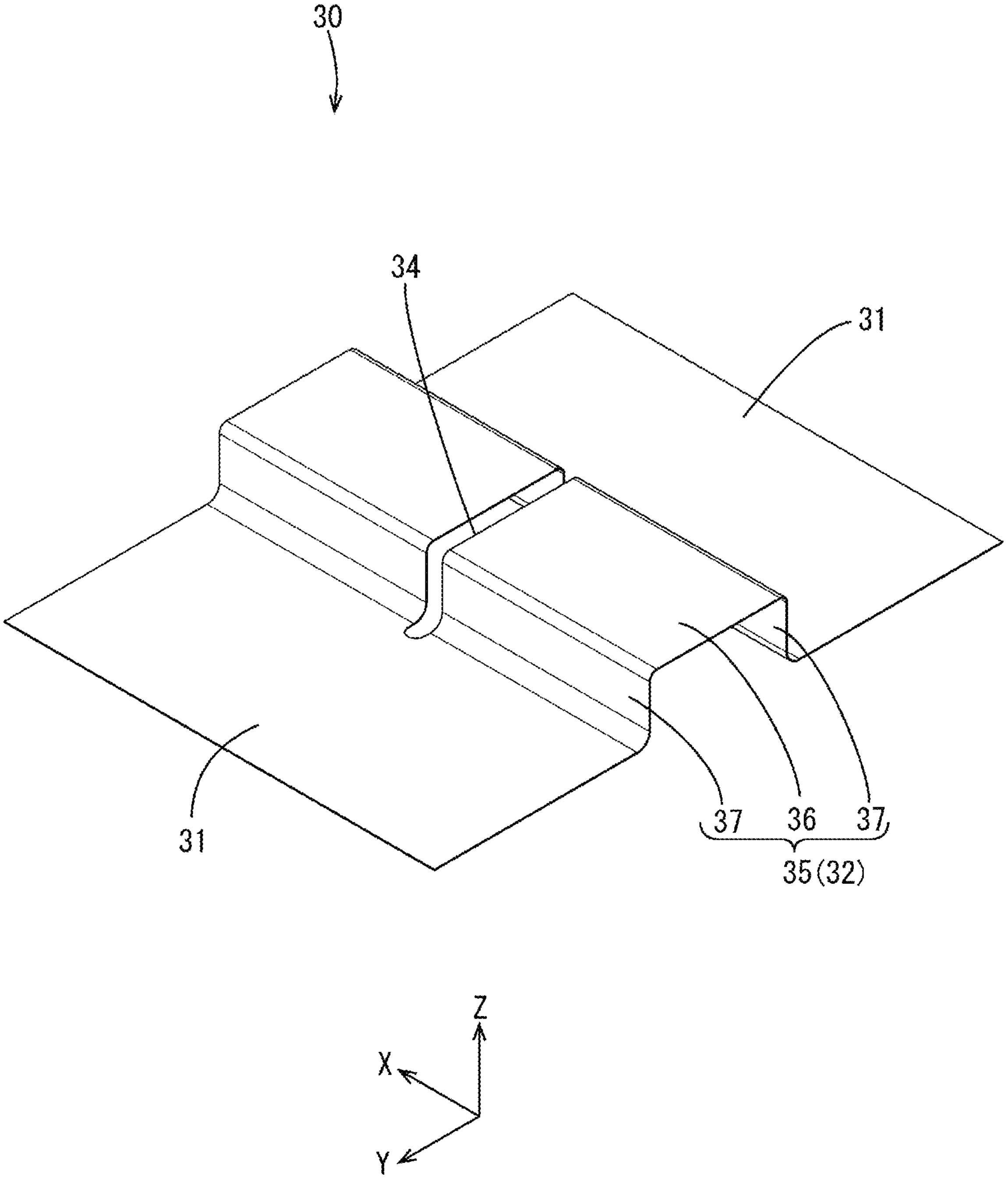
FIG. 8 is a perspective view of a single substrate.

As shown in FIG. 7, the bus bar 20 is formed by a plurality (in the present embodiment, eight) of plate-like substrates 30 that are laminated in the up-down direction. As shown in FIG. 8, the substrates 30 each include two plate portions 31 and an intermediate plate portion 32 that couples the two plate portions 31. In the present embodiment, the intermediate plate portion 32 is a protruding portion 35 that protrudes upward from the plate portions 31. The protruding portion 35 includes a protruding plate portion 36 that is parallel with the plate portions 31, and two side plate portions 37 that couple the plate portions 31 and the protruding plate portion 36 to each other. Specifically, the left side plate portion 37 connects the right end portion of the left plate portion 31 and the left end portion of the protruding plate portion 36 to each other, and the right side plate portion 37 connects the left end portion of the right plate portion 31 and the right end portion of the protruding plate portion 36 to each other. The side plate portions 37 are perpendicular to the plate portions 31. The plurality of substrates 30 have substantially the same shape and size in a plan view.

As shown in FIG. 8, each substrate 30 has a long hole portion 34 that extends through the intermediate plate portion 32 in the up-down direction. The long hole portion 34 is located at the center position in the front-rear direction of the substrate 30. The long hole portion 34 is elongated in the left-right direction, and has a predetermined dimension in the front-rear direction. The shape and size of the long holes 34 of the plurality of substrates 30 are substantially the same in a plan view.

The long hole portion 34 extends through the protruding portion 35 in the up-down direction. Specifically, the dimension in the left-right direction of the long hole portion 34 is smaller than the dimension in the left-right direction of the protruding portion 35, and left and right end portions of the long hole portion 34 are disposed at portions of the plate portions 31 that are near the protruding portion 35. In other words, the protruding portion 35 is divided in the front-rear direction by the long hole portion 34.

Figure 6:
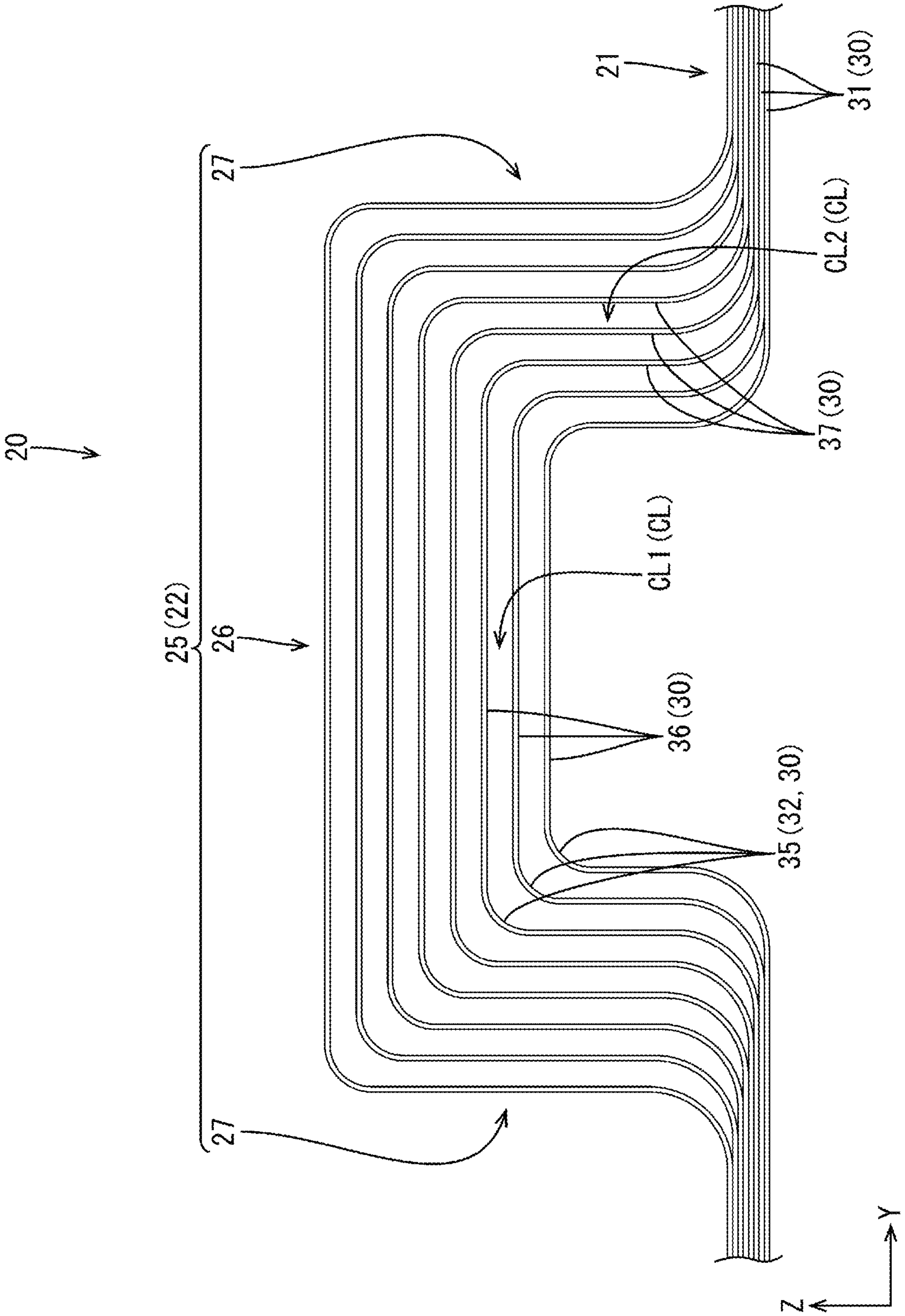
FIG. 6 is an enlarged front view of the bus bar showing a surrounding region of a raised portion.

The bus bar 20 is manufactured by laminating the plurality of substrates 30 in the up-down direction, and fixing the plate portions 31 to each other using press-fitting or the like (see FIGS. 5 to 7). As shown in FIG. 6, the connection portions 21, the intermediate portion 22, the raised portion 25, the ceiling portion 26, and the coupling portions 27 of the bus bar 20 are correspondingly formed by the plurality of plate portions 31, the intermediate plate portions 32, the raised portions 35, the protruding plate portions 36, and the side plate portions 37 of the plurality of laminated substrates 30. As shown in FIG. 4, the slit 24 of the bus bar 20 is formed by bringing the long hole portions 34 of the plurality of substrates 30 into communication with each other in the up-down direction.

Clearance

As shown in FIG. 6, in each bus bar 20, clearances CL are provided between adjacent protruding portions 35. More specifically, clearances CL1 in the up-down direction are provided between adjacent protruding plate portions 36. Clearances CL2 in the left-right direction are provided between adjacent side plate portions 37.

Due to the clearances CL being provided in this manner, the protruding portions 35 are unlikely to interfere with each other, and the protruding portions 35 are likely to deform separately. And thus, each raised portion 25 is likely to deform. Further, since a friction force and the like do not act between the protruding portions 35, the resistance that acts when the raised portion 25 deforms is reduced. Accordingly, compared to a bus bar with no clearance CL provided between adjacent protruding portions 35, the bus bar 20 is more likely to deform in the front-rear direction. Further, by providing the clearances CL, the plurality of substrates 30 can easily be laminated.

The bus bars 20 of the present embodiment are configured as described above. The following describes deformation of the bus bars 20.

Deformation of Bus Bar in Left-Right Direction and Up-Down Direction

In the present embodiment, the left right direction is the direction in which the plurality of power storage elements 11 are stacked (see FIGS. 1 and 2). The up-down direction is the direction in which the electrode terminals 12A and 12B and the electrode welding portions 23 of the bus bars 20 oppose each other, and is also the direction in which the bus bars 20 are attached to the electrode terminals 12A and 12B. Accordingly, in the left-right direction and the up-down direction, for example, a tolerance caused by expansion and contraction of the power storage elements 11, a manufacturing tolerance of the power storage elements 11, an attachment tolerance between the power storage elements 11 and bus bars 20, and the like occur. The bus bar 20 includes the raised portion 25 formed in an inverted U shape in a front view (see FIGS. 4 and 5). The raised portion 25 can elastically deform in the left-right direction and the up-down direction. And thus, the bus bar 20 can absorb the tolerances in the left-right direction and the up-down direction by deforming in the left-right direction and the up-down direction.

Deformation of Bus Bar in Front-Rear Direction

Figure 9:
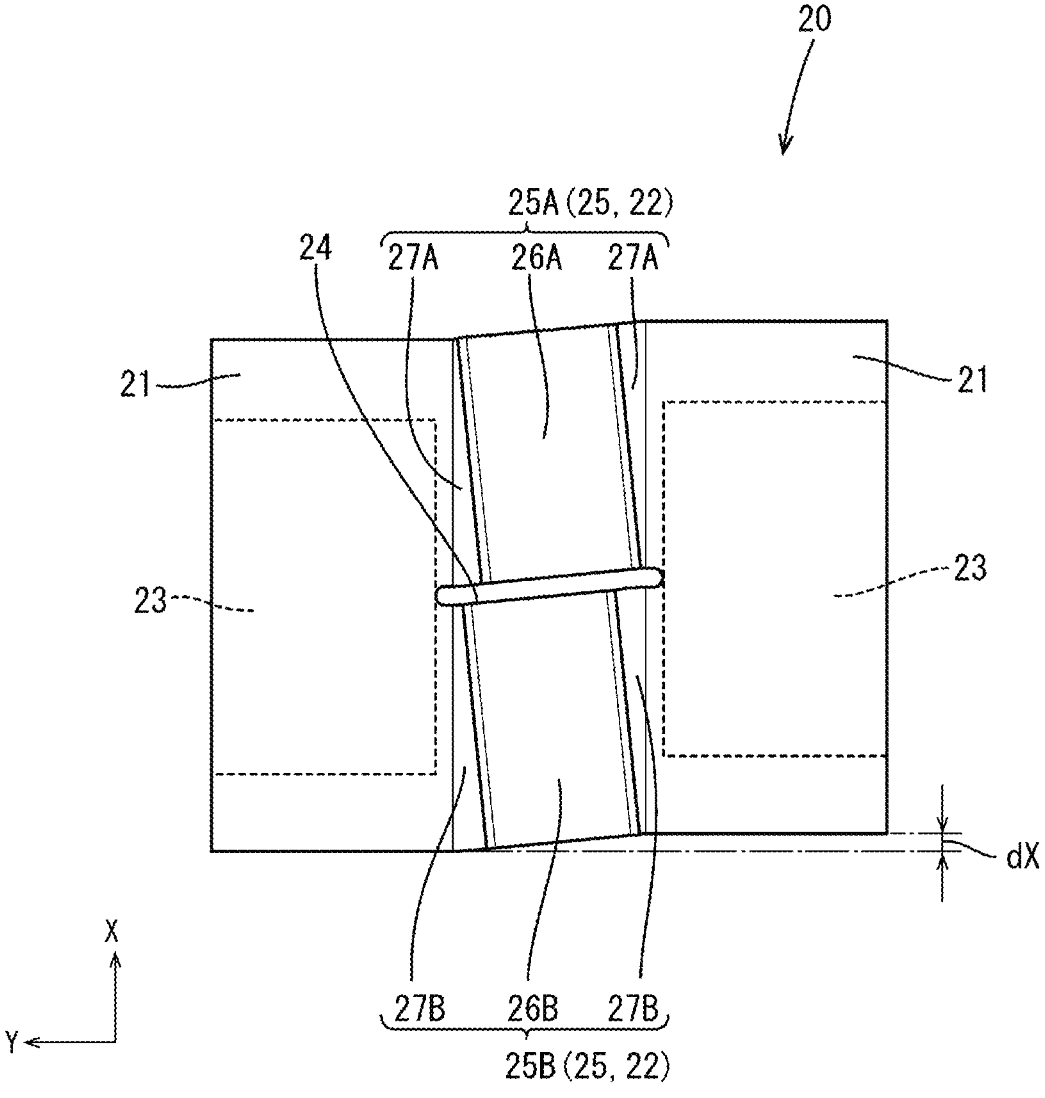
FIG. 9 is a plan view schematically showing deformation of the bus bar.

In the present embodiment, the front-rear direction is the direction that is orthogonal to both the stacking direction of the plurality of power storage elements 11, and the direction in which the bus bars 20 are attached to the electrode terminals 12A and 12B (see FIGS. 1 and 2). Depending on the position where the power storage module 10 is installed, the state of the spacers disposed between the plurality of power storage elements 11, or the like, the power storage elements 11 that are adjacent to each other in the left-right direction may be displaced in the front-rear direction. For example, as shown in FIG. 9, in the case where the right connection portion 21 is displaced frontward by dX with respect to the left connection portion 21, the raised portion 25 disposed between the left and right connection portions 21 is significantly deformed. Note that, in FIG. 9, the power storage elements 11 are not shown, and the displacement amount dX and the extent of deformation of the bus bars 20 are exaggerated (the same holds for FIG. 10).

The raised portion 25 is partitioned into the first raised portion 25A and the second raised portion 25B by the slit 24 having a predetermined dimension in the width direction. In this manner, the first raised portion 25A and the second raised portion 25B can deform independently without interfering with each other.

First, deformation of the first raised portion 25A will be discussed. If the right connection portion 21 is displaced forward by dX alone with respect to the left connection portion 21, the first ceiling portion 26A mainly rotates anticlockwise, and the first coupling portions 27A deform so as to mainly twist anticlockwise. In this manner, stress concentrates on the front end portions and the rear end portions of the first coupling portions 27A that have significantly deformed.

With respect to the second raised portion 25B, similar to the first raised portion 25A, stress concentrates on surrounding regions of the front end portions and the rear end portions of the second coupling portions 27B.

Next, unlike the present embodiment, deformation of a bus bar 720 that has no slit 24 will be described with reference to FIG. 10. The bus bar 720 is configured similarly to the bus bar 20 in the present embodiment except that no slit 24 is provided. For the bus bar 720, the same members as the bus bar 20 are given the reference numerals given for the bus bars 20.

The bus bar 720 includes two connection portions 21, and a raised portion 725 that couples the two connection portions 21. The electrode welding portions 23 are respectively provided on the lower surfaces of the connection portions 21. The raised portion 725 includes a ceiling portion 726 that is parallel with the connection portions 21, and two coupling portions 727 that couple the ceiling portion 726 to the connection portions 21, and if the right connection portion 21 is displaced forward by dX with respect to the left connection portion 21, the ceiling portion 726 largely rotates anticlockwise, and the coupling portion 727 deforms so as to be largely twisted anticlockwise. In this manner, stress concentrates on the surrounding regions of the front end portions and the rear end portions of the coupling portions 727.

Figure 10:
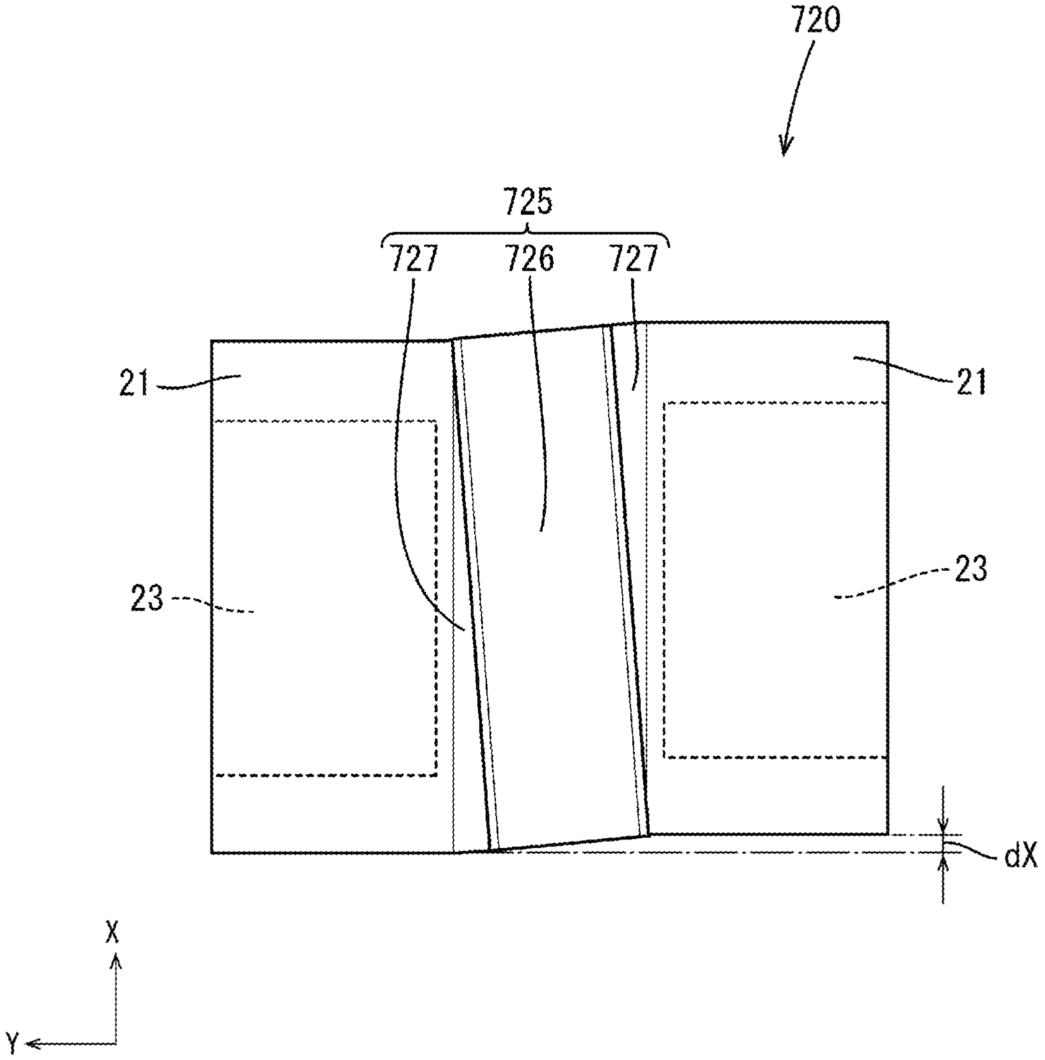
FIG. 10 is a plan view schematically showing deformation of the bus bar that is not included in the scope of the present disclosure and has no slit.

Here, deformation of the bus bar 20 is compared with deformation of the bus bar 720 (see FIGS. 9 and 10). In the bus bar 20, stress is concentrated on the surrounding regions of the front end portions and the rear end portions of the first coupling portions 27A, and the surrounding regions of the front end portions and the rear end portions of the second coupling portions 27B. On the other hand, in the bus bar 720, stress is concentrated on the front end portions and the rear end portions of the coupling portions 727. Accordingly, in the bus bar 20, stress can be distributed more than the bus bar 720.

Further, the dimensions in the front-rear direction of the first raised portion 25A and the second raised portion 25B are smaller than the dimension in the front-rear direction of the raised portion 725. And thus, in FIGS. 9 and 10, if the twisting angles of the twisting deformation are the same, the magnitude of deformation and the reactive force accompanying the twisting deformation are smaller in the front end portions and the rear end portions of the first coupling portions 27A and the front end portions and the rear end portions of the second coupling portions 27B compared to the front end portion and the rear end portion of the coupling portion 727. Accordingly, the first coupling portions 27A and the second coupling portions 27B are more likely to twist and deform than the coupling portion 727.

As described above, since the bus bar 20 is provided with the slit 24, in the case where the left and right connection portions 21 are displaced in the front-rear direction, the stress that acts on the electrode welding portions 23 can be reduced. Accordingly, damage to the welded portions of the electrode welding portions 23 and the electrode terminals 12A and 12B can be suppressed, thus making it easy to maintain reliability in electric connection between the bus bars 20 and the electrode terminals 12A and 12B.

Operation and Effects of First Embodiment

According to the first embodiment, the following operation and effects are exhibited.

The bus bar 20 according to the first embodiment is a plate-shaped bus bar 20 that connects a plurality of power storage elements 11 to each other, and includes a plurality of connection portions 21 connected to electrode terminals 12A and 12B of the plurality of power storage elements 11, and one or more intermediate portions 22 that couple adjacent connection portions 21 to each other. The connection portions 21 include electrode welding portions 23 that are disposed so as to respectively oppose the electrode terminals 12A and 12B and welded to the electrode terminals 12A and 12B, and the intermediate portion 22 is provided with one or more slit 24. The slit 24 has an elongated shape in an arrangement direction (left-right direction) in which the connection portions 21 are arranged side by side and has a predetermined dimension in a width direction (front-rear direction) orthogonal to both the arrangement direction and an opposing direction (up-down direction) in which the electrode welding portions 23 oppose the electrode terminals 12A and 12B.

According to this configuration, by providing the slit 24, the bus bar 20 is likely to deform in the width direction. Accordingly, if the power storage elements 11 are displaced in the width direction, the stress that acts on the electrode welding portions 23 that are welded to the electrode terminals 12A and 12B can be reduced. Accordingly, the electrical connection between the bus bars 20 and the electrode terminals 12A and 12B is unlikely to be impaired.

In the first embodiment, the intermediate portion 22 is the raised portion 25 that protrudes from the connection portions 21 in a direction away from the electrode terminals 12A and 12B.

According to this configuration, by providing the raised portion 25, the tolerance in the arrangement direction can be absorbed. Further, since the length of the bus bar 20 disposed between adjacent connection portions 21 is increased, the bus bar 20 is more likely to deform in the width direction.

The bus bar 20 according to the first embodiment includes a plurality of plate-shaped substrates 30 laminated in the opposing direction.

According to this configuration, the volume of the bus bar 20 can be easily increased, and thus, even if the voltage of the power storage elements 11 is increased, heat generated by the bus bar 20 can be suppressed.

In the first embodiment, each substrate 30 includes the protruding portion 35 forming the raised portion 25, and the clearances CL are respectively provided between adjacent protruding portions 35.

With this configuration, since the clearances CL are respectively provided between the adjacent protruding portions 35, the protruding portions 35 are likely to deform separately. Accordingly, the bus bar 20 is more likely to deform in the width direction.

The power storage module 10 according to the first embodiment includes the plurality of power storage elements 11 and the bus bar 20 connected to the electrode terminals 12A and 12B of the plurality of power storage elements 11.

According to this configuration, a power storage module 10 that is unlikely to impair electric connection between the bus bars 20 and the electrode terminals 12A and 12B can be provided.

Second Embodiment

A second embodiment according to the present disclosure will be described with reference to FIGS. 11 and 12. A bus bar 120 according to the second embodiment is configured similar to the bus bar 20 of the first embodiment except that a plurality of slits 124 are provided. Hereinafter, the members identical to the first embodiment are given the reference signs used in the first embodiment, and description of the configurations, operations, and effects that are identical to those of first embodiment is omitted.

Figure 11:
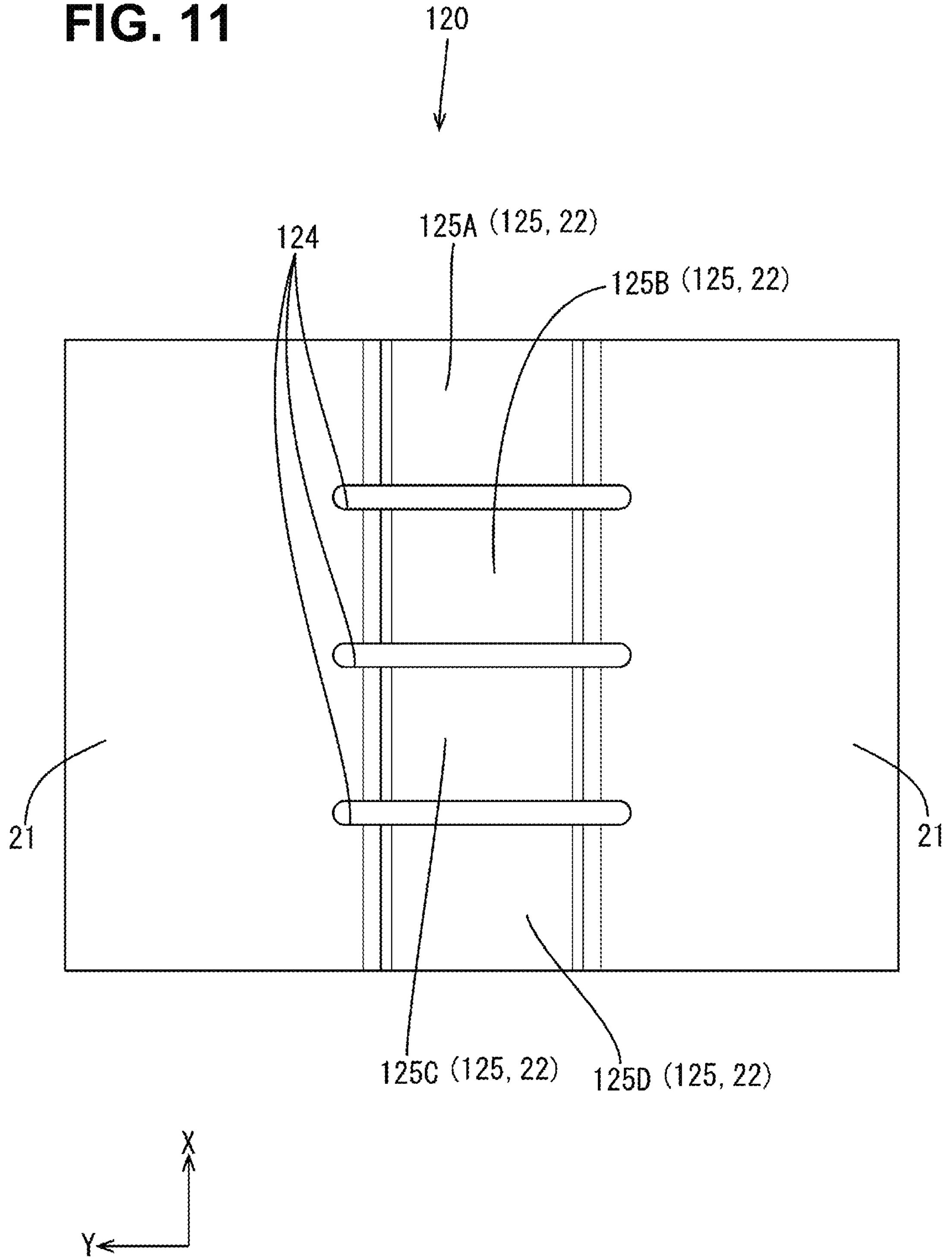
FIG. 11 is a plan view of a bus bar according to a second embodiment.
Figure 12:
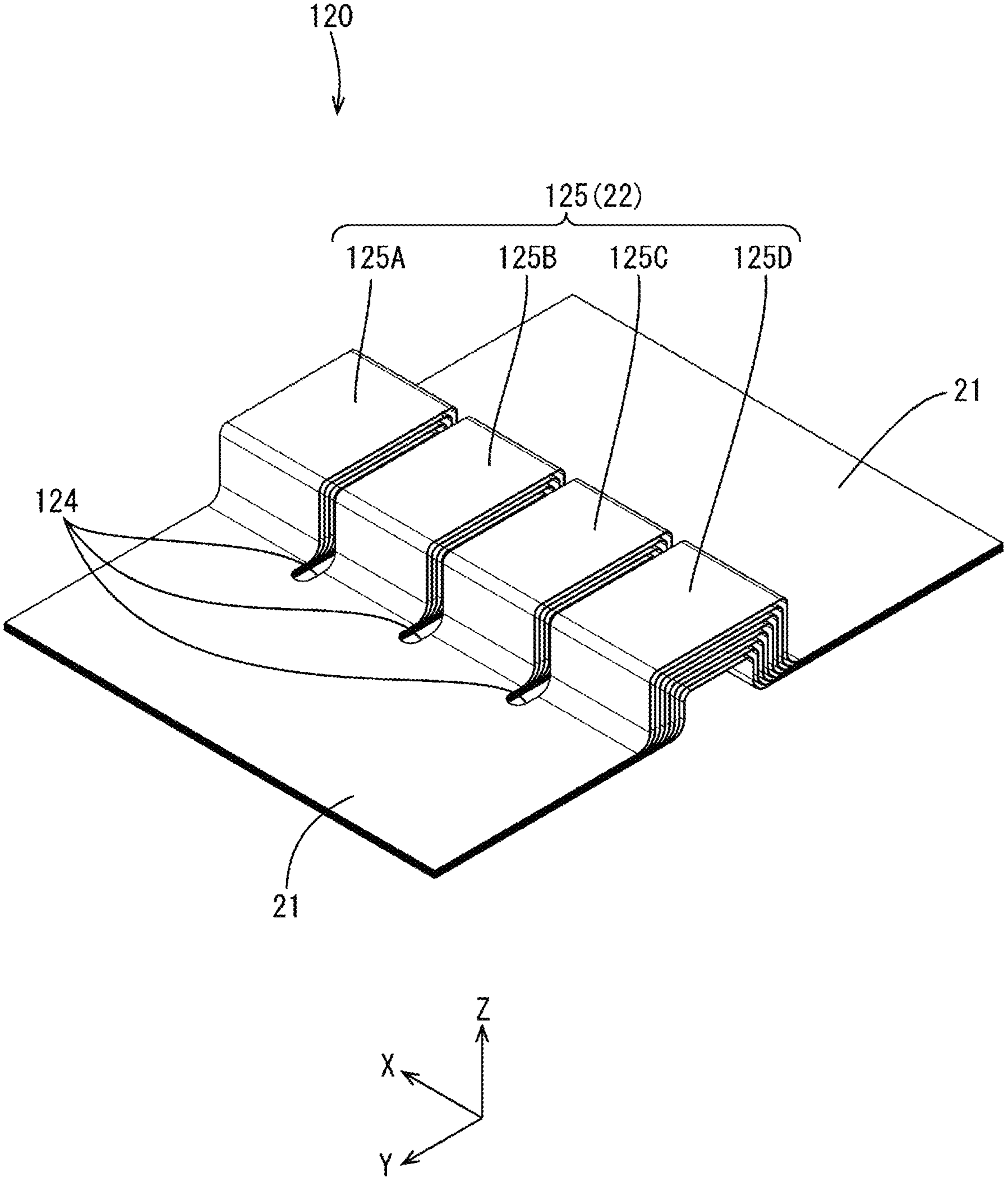
FIG. 12 is a perspective view of the bus bar.

As shown in FIGS. 11 and 12, the bus bar 120 includes a plurality of (in this embodiment, three) slits 124 that extend through the intermediate portion 22 in the up-down direction. The three slits 124 are arranged side by side in the front-rear direction in the intermediate portion 22. By providing the three slits 124, a raised portion 125 of the bus bar 120 is divided into, from the front side, a first raised portion 125A, a second raised portion 125B, a third raised portion 125C, and a fourth raised portion 125D.

The first raised portion 125A, the second raised portion 125B, the third raised portion 125C, and the fourth raised portion 125D are shorter in the front-rear direction than the first raised portion 25A and the second raised portion 25B of the first embodiment. Accordingly, as described before regarding the deformation of the bus bar 20 in the front-rear direction, if the left and right connection portions 21 are displaced in the front-rear direction, these raised portions 125A to 125D are less likely to be subjected to excessive stress than the first raised portion 25A and the second raised portion 25B.

Operation and Effects of Second Embodiment

According to the second embodiment, the following operation and effects are exhibited.

In the second embodiment, the plurality of slits 124 are provided in each intermediate portion 22, and are arranged side by side in the width direction.

According to this configuration, an increase in the number of the slits 124 makes it easier for the bus bar 120 to deform in the width direction.

Third Embodiment

Figure 13:
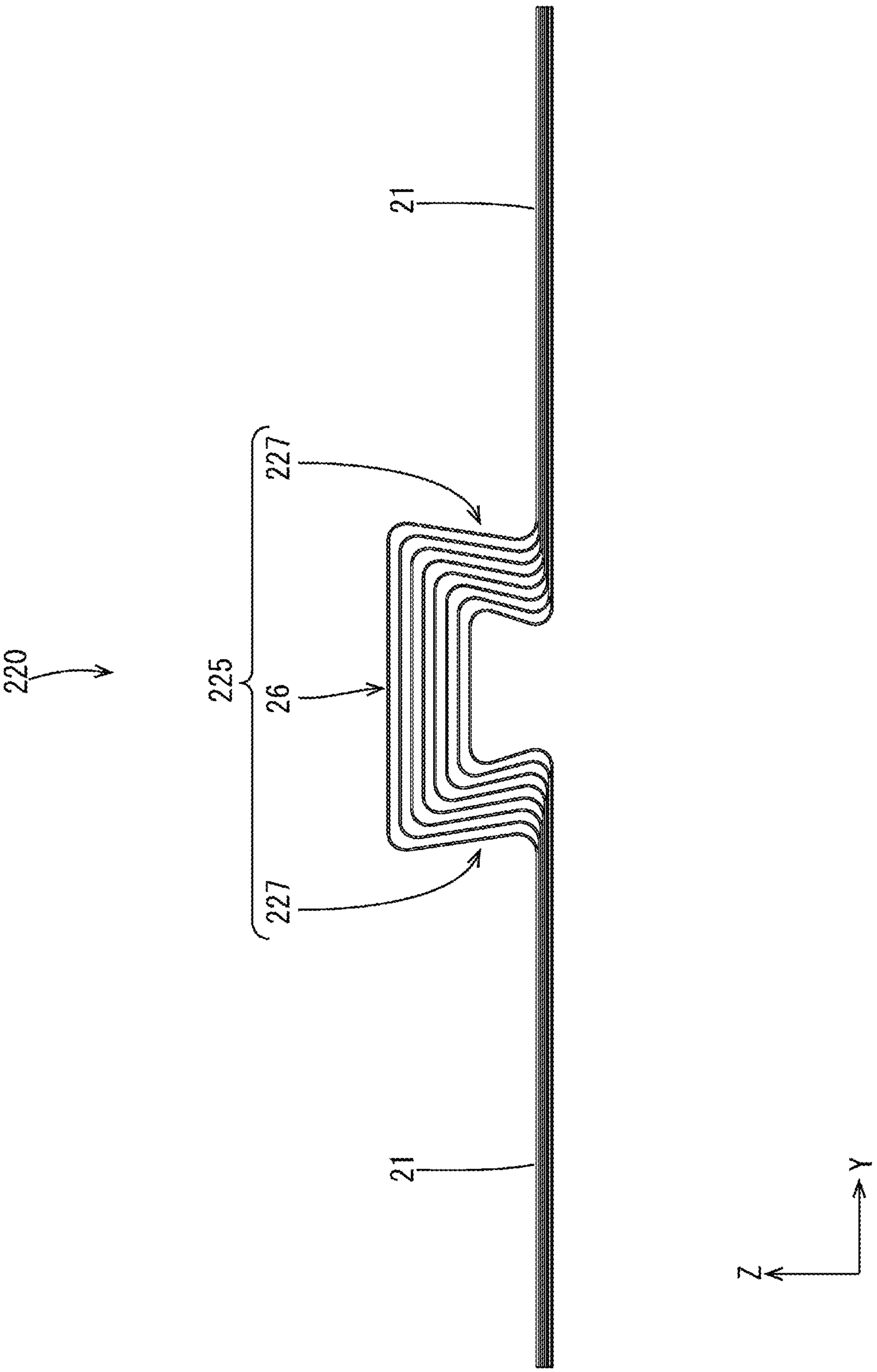
FIG. 13 is a front view of a bus bar according to a third embodiment.

A third embodiment of the present disclosure will be described with reference to FIG. 13. A bus bar 220 according to the third embodiment is configured similar to the bus bar 20 of the first embodiment except for a coupling portion 227. Hereinafter, the members identical to the first embodiment are given the reference signs used in the first embodiment, and description of the configurations, operations, and effects that are identical to the first embodiment is omitted.

In a raised portion 225 of the bus bar 220, the coupling portions 227 form an acute angle relative to the ceiling portion 26 and the connection portions 21, instead of being perpendicular thereto. Specifically, the left coupling portion 227 extends leftward while extending upward. The right coupling portion 227 extends rightward while extending upward. In other words, each coupling portion 227 is inclined toward a connection portion 21 from the ceiling portion 26 in the arrangement direction (left-right direction) from the connection portion 21 side toward the ceiling portion 26 side.

Since the coupling portions 227 of the bus bar 220 are inclined toward the connection portions 21, the length of the bus bar 220 included in the raised portion 225 can be longer compared to a case where, as in the first embodiment, the coupling portions 27, the ceiling portion 26, and the connection portions 21 are disposed orthogonal to each other (see FIG. 5). In other words, the residual length of the bus bar 220 that can deform when the bus bar 220 deforms in the front-rear direction can be set to a long length. Accordingly, in the case where the left and right connection portions 21 are displaced in the front-rear direction, the bus bar 220 is more likely to deform than the bus bar 20.

Operation and Effects of Third Embodiment

According to the third embodiment, the following operation and effects are exhibited.

In the third embodiment, the raised portion 225 includes the ceiling portion 26 that is parallel to the connection portions 21, and the coupling portions 227 that connect the ceiling portion 26 to the connection portions 21, and each coupling portion 227 is inclined toward a connection portion 21 from the ceiling portion 227 in the arrangement direction (left-right direction) from the connection portion 21 side toward the ceiling portion 26 side.

According to this configuration, since the coupling portions 227 are inclined toward the connection portions 21, the length of the bus bar 220 disposed between adjacent connection portions 21 is increased, and thus the bus bar 220 is more likely to deform in the width direction.

Fourth Embodiment

Figure 14:
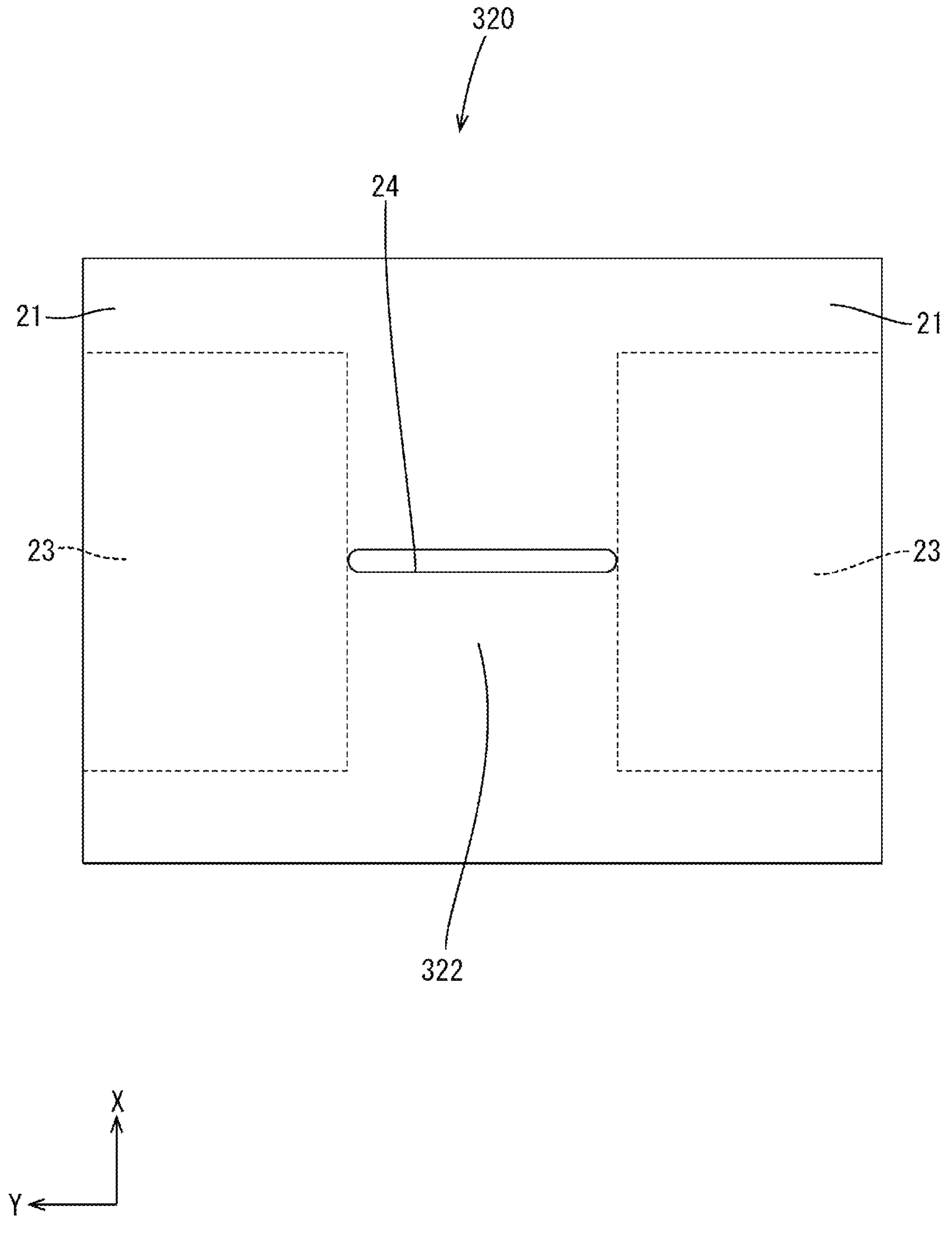
FIG. 14 is a plan view of a bus bar according to a fourth embodiment.

A fourth embodiment of the present disclosure will be described with reference to FIG. 14. A bus bar 320 according to the fourth embodiment does not have the raised portion 25 of the first embodiment. Hereinafter, the members identical to the first embodiment are given the reference signs used in the first embodiment, and description of the configurations, operations, and effects that are identical to the first embodiment is omitted.

The bus bar 320 is plate-shaped and includes two connection portions 21 and one intermediate portion 322 that couples the two connection portions 21. In other words, in the bus bar 320, the connection portions 21 and the intermediate portion 322 are configured to lie on the same plane. The bus bar 320 includes the slit 24 that extends through the intermediate portion 322 in the up-down direction.

If the left and right connection portions 21 are displaced in the front-rear direction, the intermediate portion 322 is mainly deformed. The intermediate portion 322 cannot elastically deform and the mode of deformation is different from the raised portion 25 of the first embodiment. However, by providing the slit 24, similarly to the first embodiment, an effect that the intermediate portion 322 is likely to deform is anticipated. In other words, conceivably, due to the intermediate portion 322 being divided by the slit 24, compared to the case where no slit 24 is provided, the stress that acts on the intermediate portion 322 can be distributed and the reaction force caused by deformation of the intermediate portion 322 can be reduced.

Fifth Embodiment

Figure 15:
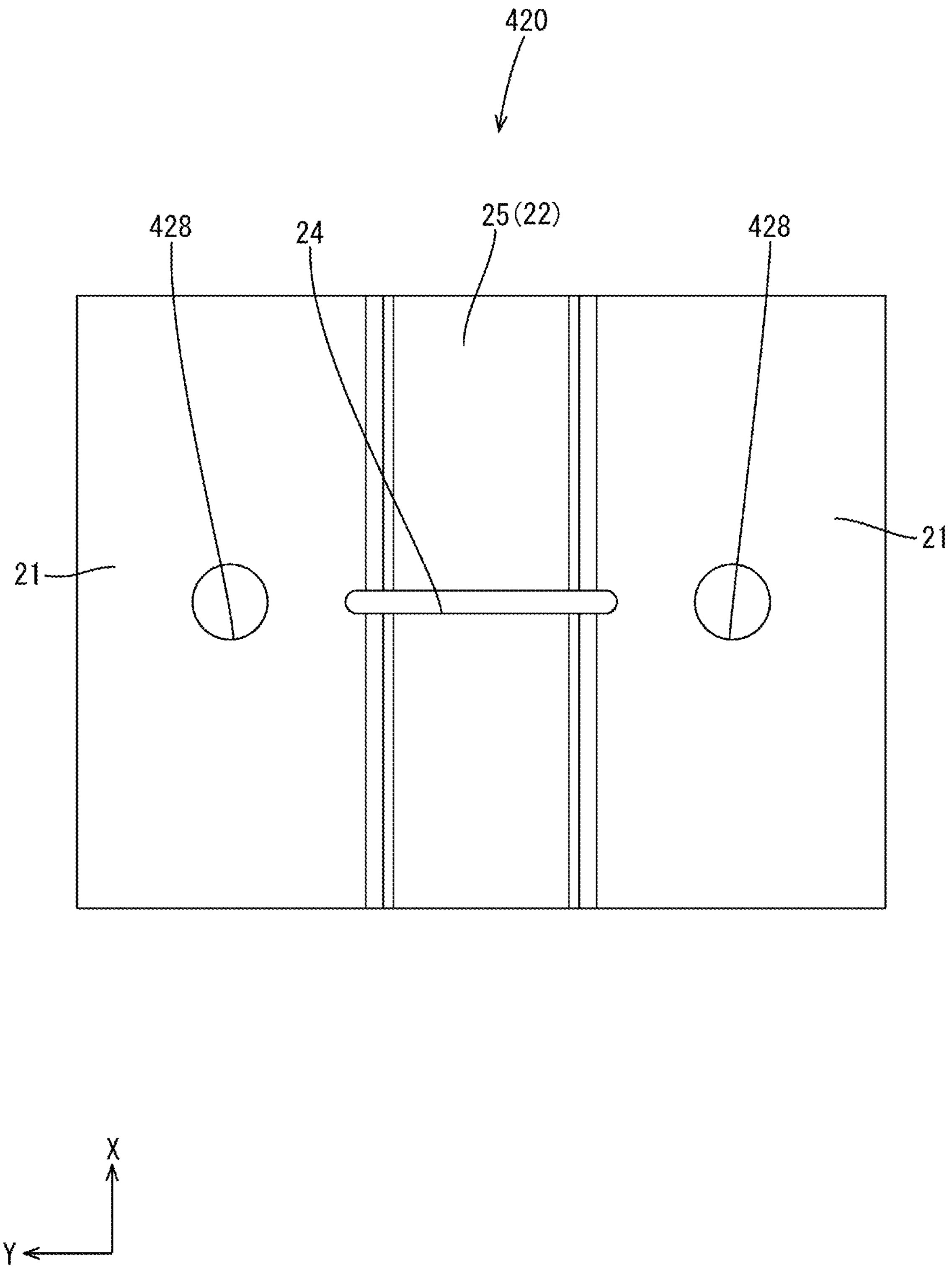
FIG. 15 is a plan view of a bus bar according to a fifth embodiment.

A fifth embodiment of the present disclosure will be described with reference to FIG. 15. A bus bar 420 according to the fifth embodiment is configured similarly to the bus bar 20 of the first embodiment, and further includes positioning holes 428 that respectively extend through the connection portions 21. Although not illustrated, the plurality of substrates 30 that form the bus bar 420 further include a circular through hole that constitutes the positioning holes 428. Hereinafter, the members identical to the first embodiment are given the reference signs used in the first embodiment, and description of the configurations, operations and effects that are identical to the first embodiment is omitted.

The positioning holes 428 are provided at a substantial center portion of each connection portion 21. Although not illustrated, the power storage elements 11 may be provided with columnar projections (not shown) that protrude upward from upper surfaces of the electrode terminals 12A and 12B. In such a case, as a result of the inner walls of the positioning holes 428 and the projections engaging with each other, the bus bar 420 can be positioned with respect to the electrode terminals 12A and 12B.

Also, when the plurality of substrates 30 are laminated in the manufacturing step of the bus bar 420, the plurality of substrates 30 can easily be positioned with respect to each other by inserting a pin or the like into through holes of the plurality of substrates 30.

Other Embodiments (1) In the first embodiment, the bus bar 20 includes the two connection portions 21 and one intermediate portion 22, and connects the electrode terminals 12A and 12B of the adjacent power storage elements 11 to each other, but there is no limitation to this. The bus bar may include three or more connection portions and an intermediate portion of a number that is smaller than the connection portions by one, and connect the power storage elements of the same number as the connection portions to each other. Also, the polarity of electrode terminals connected to the bus bar may be the same or partially different from each other.

(2) In the first embodiment, the bus bar 20 is formed by laminating the plurality of substrates 30, but there is no limitation to this. The bus bar may be formed by a single substrate.

(3) In the first embodiment, the clearance CL is disposed between the adjacent protruding portions 35, but there is no limitation to this. Adjacent protruding portions may be laminated with no gap therebetween.

(4) In the first embodiment, the raised portion 25 has an inverted U shape with corners in a front view, but there is no limitation to this. The raised portion may have an inverted U shape with rounded corners in a front view.

(5) In the first embodiment, the bus bar 20 is formed by laminating the plurality of substrates 30 that were preformed by punching or folding metal plate members, and fixing the plate members to each other, but there is no limitation to this. The order of laminating, fixing, and forming the plurality of substrates may be changed as desired. For example, the plurality of substrates may be pre-formed by punching metal plate members, then laminated, fixed, and then folded. Also, the end portions of the substrates may be trimmed after the plurality of pre-formed substrates are folded, laminated, and welded.

REFERENCE NUMERALS

10 Power storage module
11 Power storage element
12A, 12B Electrode terminal
20 Bus bar
21 Connection portion
22 Intermediate portion
23 Electrode welding portion
24 Slit
25 Raised portion
25A First raised portion
25B Second raised portion
26 Ceiling portion
26A First ceiling portion
26B Second ceiling portion
27 Coupling portion
27A First coupling portion
27B Second coupling portion
30 Substrate
31 Plate portion
32 Intermediate plate portion
34 Long hole portion
35 Protruding portion
36 Protruding plate portion
37 Side plate portion
120 Bus bar
124 Slit
125 Raised portion
125A First raised portion
125B Second raised portion
125C Third raised portion
125D Fourth raised portion
220 Bus bar
225 Raised portion
227 Coupling portion
320 Bus bar
322 Intermediate portion
420 Bus bar
428 Positioning hole
720 Bus bar
725 Raised portion
726 Ceiling portion
727 Coupling portion
CL Clearance
CL1 Clearance in up-down direction
CL2 Clearance in left-right direction
LL Dimension of slit in longitudinal direction
LW Dimension of slit in width direction
dX Displacement amount in front-rear direction of left-right connection portion

The invention claimed is:

1. A plate-shaped bus bar that connects a plurality of power storage elements to each other, the bus bar comprising:

a plurality of connection portions to be connected to electrode terminals of the plurality of power storage elements; and one or more intermediate portions that couple the adjacent connection portions, wherein the connection portions include electrode welding portions that are respectively disposed so as to oppose the electrode terminals and are welded to the electrode terminals, the intermediate portion is provided with one or more slits, each slit has an elongated shape in an arrangement direction in which the connection portions are arranged side by side and has a predetermined dimension in a width direction orthogonal to both the arrangement direction and an opposing direction in which the electrode welding portions and the electrode terminals oppose each other, the intermediate portion is a raised portion that protrudes from the connection portions in a direction away from the electrode terminals, the bus bar includes a plurality of plate-shaped substrates laminated in the opposing direction, the substrates each include a protruding portion that forms the raised portion, a clearance is provided between the adjacent protruding portions, and the clearance includes a first clearance extending in the opposing direction and a second clearance extending in the arrangement direction.

2. The bus bar according to claim 1, wherein a plurality of the slits are provided for each intermediate portion, and are arranged side by side in the width direction.

3. The bus bar according to claim 1, wherein the raised portion includes a ceiling portion that is parallel with the connection portions, and coupling portions that couple the ceiling portion and the connection portions, and the coupling portions are inclined toward the connection portions from the ceiling portion in the arrangement direction from the connection portion side toward the ceiling portion side.

4. A power storage module comprising:

a plurality of power storage elements; and the bus bar according to claim 1 that is connected to the electrode terminals of the plurality of power storage elements.

* * * * *